Sept. 1, 1931.  J. H. HILLS  1,820,974
FILTER
Filed March 6, 1929   2 Sheets-Sheet 2
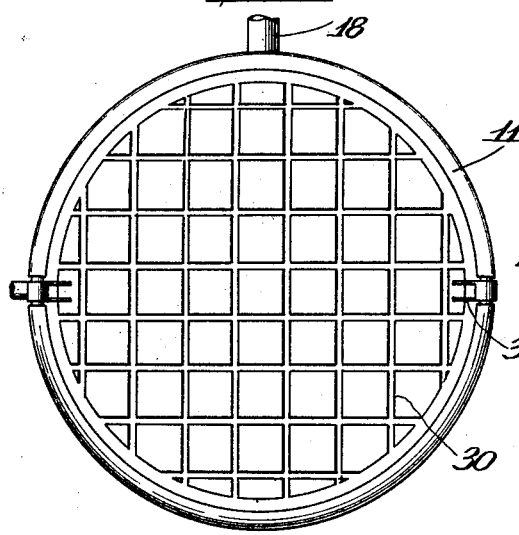
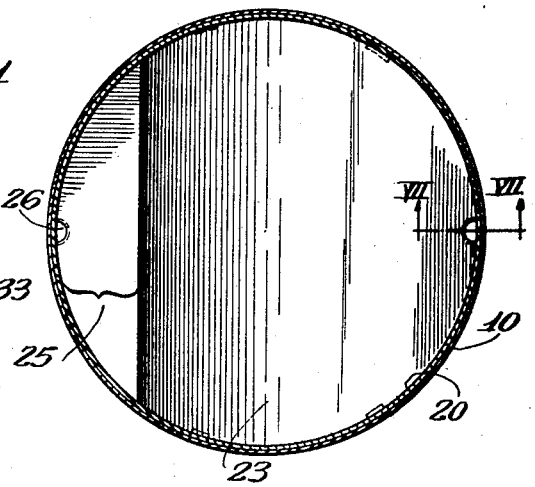
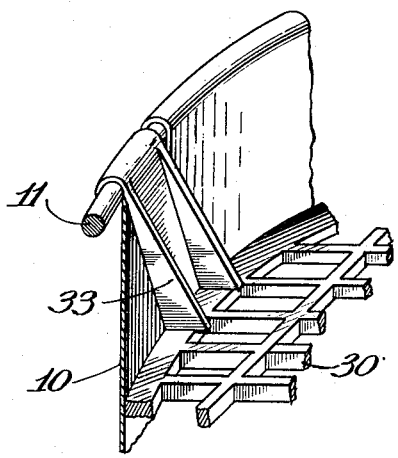
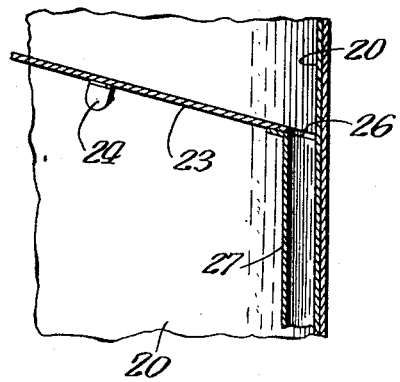
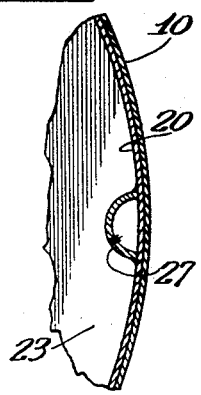
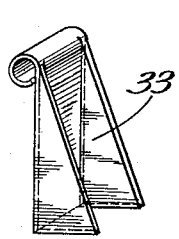
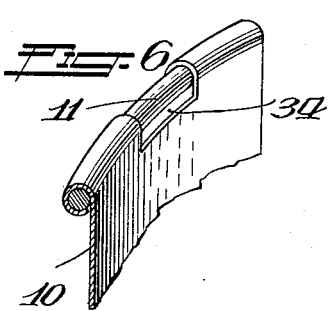
Inventor:
John H. Hills.
by: Charles K. Hill
Attys.

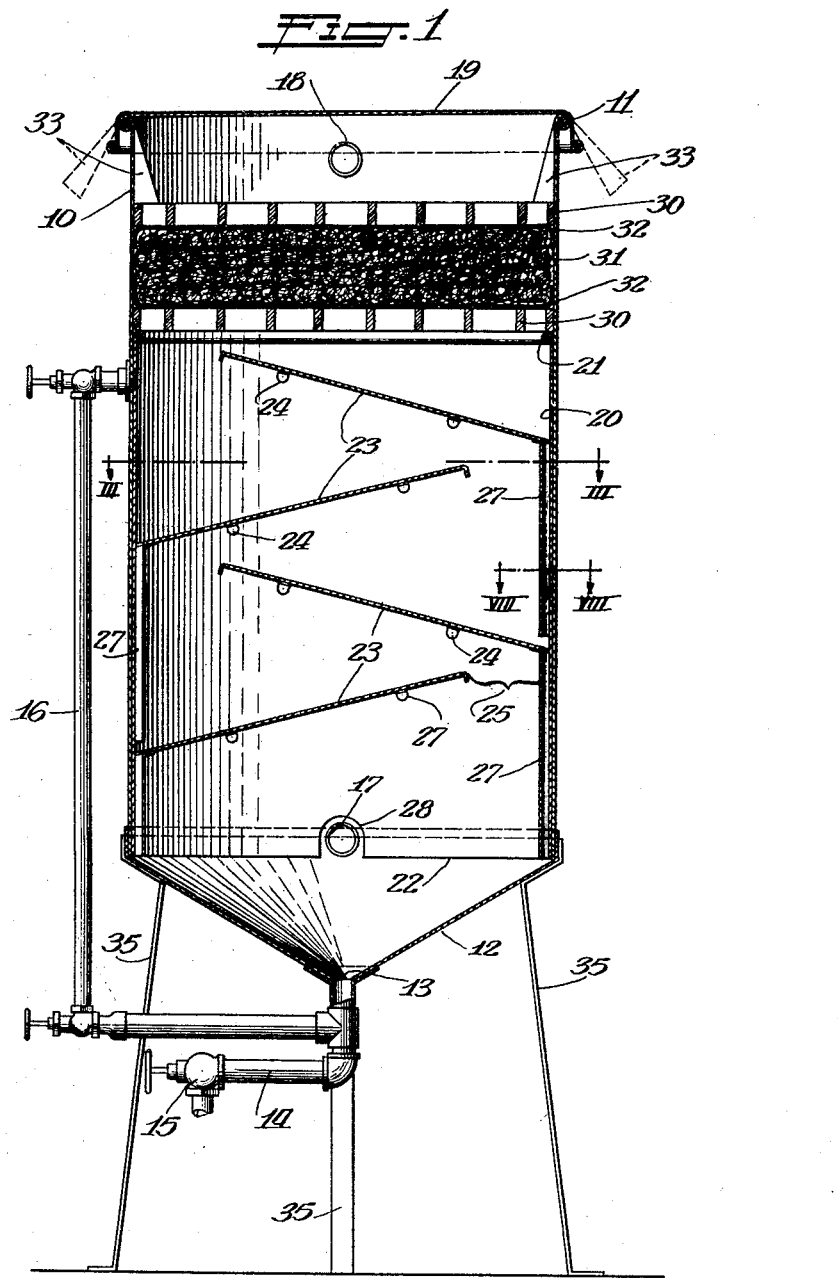

Patented Sept. 1, 1931

1,820,974

UNITED STATES PATENT OFFICE

JOHN H. HILLS, OF GRAND RAPIDS, MICHIGAN, ASSIGNOR TO BOUSMAN MFG. CO., A CORPORATION OF MICHIGAN

FILTER

Application filed March 6, 1929. Serial No. 344,673.

This invention relates to a combined gravity type water separator and moisture absorption filter for treating liquids lighter than water, such, for example, as solvents used in dry cleaning.

It is an object of this invention to provide an improved apparatus for cleaning and removing moisture from distilled liquids such as the solvents commonly used in the dry cleaning process. Such solvents are used over and over again by distilling the dirty liquid and condensing the vapor. The most generally satisfactory distillation method involves the introduction of steam into the liquid, the condensate from the steam so used being mixed with the condensed and purified solvent. It is accordingly necessary to remove the moisture in the solvent, which is non-miscible therewith and therefore in the form of finely dispersed water particles throughout the solvent. Settling will not remove all the moisture when so distributed throughout the solvent. My improved apparatus comprises a series of baffles forming settling chambers together with a moisture absorption filter which serves, aside from the removal of solids, to coagulate or gather the finely divided water particles into larger droplets which are absorbed or held by the filtering medium until the filter becomes wet enough to drip water down to the baffles from which it can be drained away. The filter is purposely made large enough to reduce the rate of solvent flow therethrough to prevent the solvent from again picking up the water separated therefrom.

It is another object of this invention to provide an improved filter structure embodying an inclosing casing with a unitary baffle structure insertable therein together with a filter structure superimposed on the baffle structure and held in compacted condition thereagainst by releasable lugs carried by the casing.

Other and further important objects of this invention will be apparent from the disclosures in the specifications and accompanying drawings.

This invention (in a preferred form) is illustrated in the drawings and hereinafter more fully described.

On the drawings:

Figure 1 is a vertical section through a filter embodying the features of this invention.

Figure 2 is a top plan view thereof with the cover removed.

Figure 3 is a section on the line III—III of Figure 1.

Figure 4 is a fragmentary perspective detail of the mounting of one of the filter retaining lugs.

Figure 5 is a perspective detail of one of the lugs.

Figure 6 is a fragmentary perspective detail of the rim of the casing adjacent the location for the lug.

Figure 7 is a fragmentary enlarged section on the line VII—VII of Figure 3.

Figure 8 is a fragmentary enlarged section on the line VIII—VIII of Figure 1.

As shown on the drawings:—

A cylindrical open ended casing 10 has its top edge beaded or turned over a reinforcing ring 11. The bottom of the casing is closed by an inverted conical end 12 terminating in an outlet 13 which is provided with a drain 14 and valves 15. A gage glass 16 is connected to the pipe 14 at its lower end and to the casing 10 adjacent the bottom of the filtering element, to be presently described. The casing has a lower inlet connection 17 adjacent the bottom thereof and a top outlet 18 adjacent the top thereof, the casing being provided with a cover 19 to prevent evaporation of the liquid passing therethrough.

A removable shell like open ended container 20 occupies the lower portion of the casing 10 and is provided with a beaded top rim 21 to form a shelf, the lower edge 22 resting on the conical bottom end 12. This shell has a number of oppositely disposed inclined baffles 23 mounted therein by lugs 24 soldered or riveted in place, each baffle fitting closely to the shell except for a sector 25 at its higher edge forming the passage for the upwardly flowing liquid, which thus flows back and forth over the successive baffles. Any liquid settling out from the solvent under treatment tends to flow to the lower edge of each inclined baffle where apertures 26 are formed opening into channels 27 intended to keep the settled out liquid from remixing with the solvent, these channels extending downwardly nearly to the next lower baffle on the same side of the shell. The lowermost baffles on each side have channels terminating adjacent the conical bottom 12 of the casing which thus forms a sludge and water pocket in an undisturbed area below the inlet 17. The shell 20 is notched over the inlet as indicated at 28 in order to locate the shell relative to the gage glass top connection.

The shelf formed by the beaded rim 21 of the shell 20 supports a stiff grating 30 which in the present showing is cast to shape but obviously may be made in other ways. A filtering element comprising a filtering bed 31 of absorbent material such as cotton waste is covered top and bottom by a porous cloth 32 provided to retain the absorbent material on the grating. The cloth may, if desired, be chemically treated to assist in removing water. A second grating 30 is laid on top the filtering bed and is held down in position by a pair of lugs 33 pivoted on an exposed section of the casing bead ring 11 formed by cutting an opening 34 in the casing as shown in Figure 6. The lugs are so formed that they can be turned up and outside the casing 10 to permit successive removal of the gratings and filter bed and the shell containing the series of baffles.

As shown in Figure 1 the casing 10 may conveniently be mounted on legs 35 if so desired.

In the operaton of the combined gravity type of water separator and moisture absorption filter of this invention the incoming solvent, containing appreciable quantities of water in a finely divided state, flows upwardly and back and forth over the sucessive opposed baffles. As the area of the passages are many times that of the inlet the flow is very slow and a large proportion of the suspended water settles out upon the various baffles where its greater specific gravity causes it to flow to the low edges thereof and down the drain channels into the drainage sump. The liquid reaching the filtering bed has its remaining water removed by the coagulating action of the absorbent material therein which has the effect of gathering together the mist like water particles into larger drops which more readily settle out of the solvent due to the greater specific gravity of the water.

It will thus be seen that I have invented an improved and simplified filter and settling chamber that can be readily opened up and cleaned and that will efficiently remove water from lighter liquids non-miscible therewith and that can easily be maintained at top efficiency because of the accessibility thereof.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A filter of the class described comprising an enclosing casing arranged with suitable inlet and outlet connections to provide upward flow of the liquid to be filtered, a removable shell positioned therein, said shell having a series of sloping baffles therein with drain channels positioned at the lowest points thereof, a removable grating resting on said shell, a bed of filtering material positioned on said grating, a second grating above said filtering material, and lugs pivoted to said enclosing casing to be swung outside thereof to clear said shell and adapted in one position to bear against said second grating to retain said various parts in position in said enclosing casing.

2. A filter of the class described comprising an enclosing casing arranged with suitable inlet and outlet connections to provide upward flow of the liquid to be filtered, a removable shell positioned therein, said shell having a series of sloping baffles therein with drain channels positioned at the lowest points thereof, a removable grating resting on said shell, a bed of filtering material comprising a loose absorbent material enclosed between layers of porous fabric, said filtering material being positioned on said grating, a second grating above said filtering material and lugs pivoted to said enclosing casing to be swung outside thereof to clear said shell and adapted in one position to bear against said second grating to retain said various parts in position in said enclosing casing.

3. A filter adapted to separate liquids of different gravity comprising an inclosing casing having a drainage pocket at its lowest point, a shell inserted therein above said pocket, a series of alternately arranged and upwardly and inwardly inclined baffles positioned in said shell, drainage channels opening from low points in said baffles and extending from each baffle to a position immediately above the next lower baffle, the drainage channels from the lowermost baffle extending to said drainage pocket, a filtering medium positioned above said shell and supported thereby, and an outlet from said casing above said filtering element.

4. A filter adapted to separate liquids of different specific gravity comprising an inclosing casing having a drainage pocket at its lowest point, a shell inserted therein above said pocket, a series of alternately arranged and upwardly and inwardly inclined baffles positioned in said shell, drainage channels opening from low points in said baffles and extending from each baffle to a position immediately above the next lower baffle, the drainage channels from the lowermost baffle extending to said drainage pocket, a filtering medium positioned above said shell and supported thereby, releasable means carried by said casing and adapted to press said filtering medium against said shell, and an outlet from said casing above said filtering element.

5. A filter adapted to separate liquids of different specific gravity comprising an inclosing casing having a drainage pocket at its lowest point, a shell inserted therein above said pocket, a series of alternately arranged and upwardly and inwardly inclined baffles positioned in said shell, drainage channels extending from low points in said baffle to a position immediately above the next lower baffle, the drainage channels from the lowermost baffles extending to said drainage pocket, a filtering medium comprising a loosely packed absorbent material enclosed between layers of porous fabric, said filtering medium being positioned above said shell and supported thereby, and an outlet from said casing above said filtering element.

6. A filter adapted to separate liquids of different specific gravity comprising an inclosing casing having a drainage pocket at its lowest point, a shell inserted therein above said pocket, a series of alternately arranged and upwardly and inwardly inclined baffles positioned in said shell, drainage channels extending from low points in said baffles and extending from each baffle to a position immediately above the next lower baffle, the drainage channels from the lowermost baffles extending to said drainage pocket, a filtering medium comprising a loosely packed absorbent material enclosed between layers of porous fabric, said filtering medium being positioned above said shell and supported thereby, releasable means carried by said casing and adapted to press said filtering medium against said shell.

7. In a filter adapted to separate liquids of different specific gravities as the main body of the liquid flows upwardly through the filter, an enclosing casing having a liquid inlet and a drainage pocket below the inlet, inclined baffle means in the casing arranged to alternately direct and to alternately restrict and enlarge the path of the body of liquid as it flows upwardly, and conduit means connected with the baffles in the path of the body of fluid at substantially a point where the path is of greatest enlargement, the said conduits being arranged to guide the separated heavier constituents of the liquid to the said drainage pocket.

In testimony whereof I have hereunto subscribed my name at Chicago, Cook county, Illinois.

JOHN H. HILLS.